United States Patent [19]

Bayart

[11] Patent Number: 6,069,731
[45] Date of Patent: May 30, 2000

[54] CONSTANT PASSBAND VARIABLE GAIN OPTICAL AMPLIFIER AND SYSTEM FOR AUTOMATICALLY COMPENSATING VARIATIONS IN LOSSES ON AN OPTICAL LINK INCLUDING AN AMPLIFIER OF THIS KIND

[75] Inventor: Dominique Bayart, Clamart, France

[73] Assignee: Alcatel, Paris, France

[21] Appl. No.: 08/952,703

[22] PCT Filed: Apr. 14, 1997

[86] PCT No.: PCT/FR97/00658

§ 371 Date: Nov. 24, 1997

§ 102(e) Date: Nov. 24, 1997

[87] PCT Pub. No.: WO97/39547

PCT Pub. Date: Nov. 23, 1997

[30] Foreign Application Priority Data

Apr. 15, 1996 [FR] France ................................. 9604668

[51] Int. Cl.[7] ............................................ H01S 3/00
[52] U.S. Cl. ................................................ 359/341
[58] Field of Search .................... 359/341, 124

[56] References Cited

U.S. PATENT DOCUMENTS

| | | | |
|---|---|---|---|
| 5,392,154 | 2/1995 | Chang et al. | 359/341 |
| 5,452,116 | 9/1995 | Kirby et al. | 359/124 |
| 5,675,432 | 10/1997 | Kosaka | 359/341 |
| 5,815,613 | 9/1998 | Fatehi et al. | 385/22 |
| 5,889,610 | 3/1999 | Fatehi et al. | 359/341 |

FOREIGN PATENT DOCUMENTS

0655632A1  5/1995  European Pat. Off. .

OTHER PUBLICATIONS

L. Eskildsen et al "Self–Regulating WDM Amplifier Module for Scalable Lightwave Networks", *IEEE Photonics Technology Letters*, vol. 6, No. 11, Nov. 1, 1994, pp. 1321–1323.

Patent Abstracts of Japan, vol. 018, No. 284 (P–1745), May 30, 1994 corresponding to JP 06 051355 A (NEC Corp) dated Feb. 25, 1994.

G. R. Hill et al "A Transport Network Layer Based on Optical network Elements", *Journal of Lightwave Technology*, vol. 11, No. 5/06, May 1, 1993, pp. 667–676.

*Primary Examiner*—Mark Hellner
*Attorney, Agent, or Firm*—Sughrue, Mion, Zinn, Macpeak & Seas, PLLC

[57] ABSTRACT

The gain of a constant passband variable gain optical amplifier is adjusted by a gain control signal (9G) that can take m discrete values. In one embodiment it includes m amplifiers ($G_1, \ldots, G_m$) each having a fixed gain different from the gains of the other amplifiers and a passband identical to that of the others; an optical switch (SW1) having an input (E) coupled to the input (EA) of the variable amplifier (AGV1), m outputs ($S_1, \ldots, S_m$) respectively coupled to the inputs of the m fixed gain amplifiers ($G_1, \ldots, G_m$) and a control input receiving the gain control signal (G); and an optical switch (SW2) having m inputs ($E_1, \ldots, E_m$) respectively coupled to the outputs of the m fixed gain amplifiers ($G_1, \ldots, G_m$), an output (SC) coupled to the output (SA) of the variable gain amplifier (AGV1) and a control input receiving the gain control signal (G). The invention is particularly applicable to long-haul optical links and spectral multiplexing.

10 Claims, 6 Drawing Sheets

CONSTANT PASSBAND VARIABLE GAIN OPTICAL AMPLIFIER AND SYSTEM FOR AUTOMATICALLY COMPENSATING VARIATIONS IN LOSSES ON AN OPTICAL LINK INCLUDING AN AMPLIFIER OF THIS KIND

BACKGROUND OF THE INVENTION

The invention concerns long-haul optical links and in particular those that transmit a plurality of wavelength-division multiplexed optical signals. To compensate the losses caused by the distance, a link of the above kind is divided into a plurality of sections and an optical amplifier is inserted between two successive sections to compensate the losses. The transmission of a plurality of wavelength-division multiplexed optical signals necessitates the use of amplifiers having a relatively wide and flat passband to offer the same gain to all the optical signals, regardless of the carrier wavelength.

In the case of a doped fiber amplifier, the variations of the gain as a function of the wavelength, for a given length of fiber, are minimal for a certain value of its mean gain. To minimize the variations of gain as a function of wavelength, in order to transmit the greatest possible number of wavelength-division multiplexed optical signals, it is necessary to choose the mean gain value corresponding to the maximal passband for a fixed gain excursion. This optimal value of the mean gain depends only on the length of the doped fiber and the transmission losses of the amplifier components for a given type of fiber. The pump power is therefore chosen so that the mean gain has this optimal value. The value of the mean gain must remain constant for the passband to remain optimized. Amplifiers are therefore used in which the mean gain is regulated individually by a control system. A long-haul link is divided into sections the length of which gives rise to nominal losses such that they are exactly compensated by an amplifier optimized in this way.

On a long-haul link the losses can vary, i.e. increase over their nominal value, accidentally, even if the amplifiers remain perfectly operational, and with an individual gain that is perfectly stabilized. These variations in the losses can be due to variations in the characteristics of the optical fiber sections or of the connections between the optical fiber sections. It is then desirable to have at least one variable gain optical amplifier to compensate the variations in the losses on the link. However, it is not possible to vary the gain of a conventional optical fiber amplifier and at the same time retain the optimization of the response curve in the passband.

One solution to this problem is to associate a fixed gain amplifier, overrated compared to the nominal losses, with an optical attenuator on its output side. The amplifier then includes a doped fiber having a length greater than the length corresponding to the optimal gain and an optical pump the power of which is also greater than the power corresponding to the optimal gain. Because the power of a pump laser diode cannot easily be increased by more than 3 dB relative to the usual values, the maximal variation in the losses that can be compensated, expressed in decibels, is also limited to 3 dB.

Semiconductor optical amplifiers can also be used to compensate the losses on a long-haul link. The mean gain of an amplifier of this kind is regulated so that it does not fluctuate with the transmitted optical signals. It is generally regulated by operating the amplifier under laser conditions. This regulation process does not allow the mean gain to be varied to compensate an increase in the losses on the link.

Another solution is described in: SELF-REGULATING WDM AMPLIFIER MODULE FOR SCALABLE LIGHTWAVE NETWORKS, Goldstein et al, in OPTICAL AMPLIFIERS AND THEIR APPLICATIONS, TECHNICAL DIGEST, Series Volume 14, Aug. 3–5, 1994, BRECKENRIDGE Colo. This document describes an amplifier for a wavelength-division multiplex enabling each of the carriers to be amplified separately and thus eliminating the problem of maintaining a wide passband having a flat response curve. To amplify an optical multiplex including m carriers it includes:

an optical demultiplexer having m outputs and one input, an optical multiplexer having m inputs and one output, and m optical amplifiers having a common optical pump and each incorporating an independent doped fiber.

The output of the demultiplexer corresponding to a given wavelength is connected by an independent amplifier to the input of the multiplexer corresponding to the same given wavelength. The m amplifiers have the same gain for each of the respective m wavelengths so that all the carriers are amplified the same. To vary the common gain of these amplifiers it is possible to operate on the power of the optical pump common to the amplifiers without altering the passband of the system. The variations in the individual passband of each amplifier are of little importance, since each amplifier has to amplify only one carrier. This prior art device has the disadvantage of requiring a number of optical amplifiers, a number of multiplexer inputs and a number of demultiplexer outputs that increase with the number m of optical carriers constituting the optical multiplex to be amplified. Also, the multiplexer and the demultiplexer cause high optical losses.

SUMMARY OF THE INVENTION

The aim of the invention is to propose another solution whose complexity does not increase in proportion to the number of carriers in the optical multiplex.

The invention consists in a variable gain optical amplifier having a given passband, its gain being adjusted by a gain control signal that can take m discrete values, characterized in that it includes:

m optical amplifiers each having a fixed gain different from the gains of the other amplifiers and a gain excursion as a function of wavelength at most equal to a common value in the given band;

first switching means having an input coupled to the input of the variable gain amplifier, m outputs respectively coupled to the inputs of the m fixed gain amplifiers and a control input receiving the gain control signal; and second optical switching means having m inputs respectively coupled to the outputs of the m fixed gain amplifiers, an output coupled to the output of the variable gain amplifier and a control input receiving the gain control signal.

The amplifier thus characterized has a passband that can be optimized for each respective gain value because it includes m amplifiers operating independently of each other.

In a first preferred embodiment the first switching means include an optical switch connecting its input to one only of its outputs, this output being determined by the gain control signal.

In a second preferred embodiment the first switching means include:

a star coupler coupling the input of the variable gain amplifier to inputs of all the fixed gain amplifier simultaneously; and means for supplying power to one only of the fixed gain amplifiers, this amplifier being selected in accordance with the gain control signal.

The invention also consists in a system for automatically compensating variations in the losses on an optical link characterized in that it includes a variable gain amplifier according to any one of claims 1 through 9 controlled by means for relative measurement of the losses on the link, the latter means supplying a signal used as the gain control signal.

BRIEF DESCRIPTION OF THE DRAWING

The invention will be better understood and other features will become apparent from the following description and the accompanying figures.

DETAILED DESCRIPTION OF THE INVENTION

Figure 1:
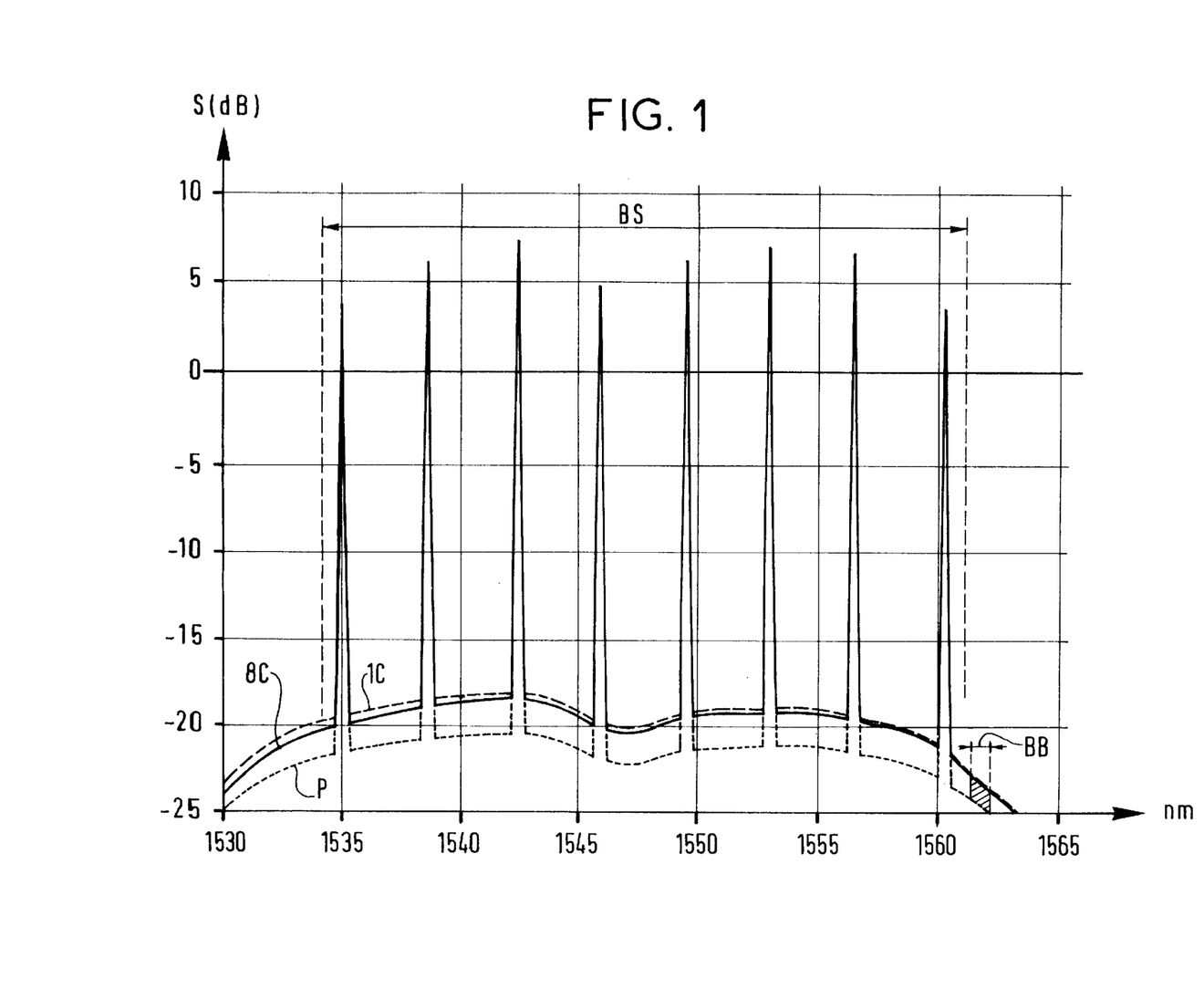
FIG. 1 represents the spectrum of the output signal S of one example of a long-haul optical link.

FIG. 1 represents the spectrum of the signal S supplied at the output of a long-haul optical link incorporating a plurality of fixed gain optical amplifiers. In this example, the link is able to transmit up to eight optical signals conveyed by eight respective carriers spread across a signal band BS extending from 1,535 nm to 1,560 nm.

The spectrum 8C shown in continuous line is obtained when eight signals are retransmitted simultaneously. The spectrum 1C shown in dashed line is obtained when the link transmits only one optical signal, conveyed by the carrier of wavelength 1,535 nm, for example. In the latter case, the peak corresponding to 1,535 nm is virtually coincident with that observed in the previous case because the gain of the amplifiers is regulated to be independent of the number of optical signals. The spectrum of the noise transmitted by the link can be seen outside the peaks. Its spectrum has the same shape as the passband of the link, i.e. a bell shape in which the relatively flat summit corresponds to the wanted signal band BS because the response curve of the amplifiers spread along the link is optimized to be virtually flat in the band BS and obviously falls off outside this band.

Another spectrum P shown in dotted line is obtained when eight optical signals are transmitted but with a loss of 5 dB caused by a fault on the link, for example a mechanical defect at the junction between two fiber sections. The spectrum P is virtually identical to the spectrum 8C except that it is 5 dB down relative to the latter. This is explained by the fact that the amplifiers along the link have a fixed gain stabilized by a control device. These amplifiers compensate only the nominal losses of the link but cannot react to compensate an accidental additional loss.

As shown in FIG. 1, the noise transmitted by the link is virtually unchanged when the number of optical signals varies, because the gain of the amplifiers is regulated. On the other hand, its spectrum is 5 dB down when the link losses are accidentally increased 5 dB. Measuring the noise therefore provides a relative measurement of the variation in the link losses. It consists in filtering the signal S supplied by the link to extract a noise signal situated in a band BB between 1,561 nm and 1,562 nm, which is outside the band BS, and measuring the mean power of the noise signal in this band BB. Any variation of this mean power relative to a nominal value gives the relative value of the accidental losses on the link. It is then possible to compensate these accidental losses by means of a constant passband variable gain optical amplifier.

Figure 2:
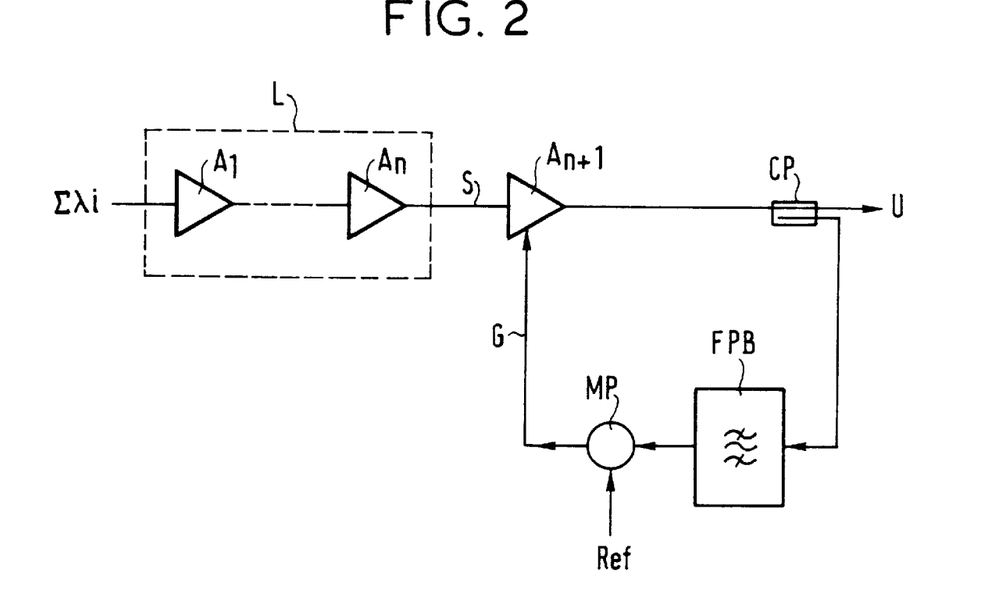
FIG. 2 represents the block schematic of a first example of an application of the amplifier of the invention.

FIG. 2 represents the block schematic of a first example of an application of the amplifier of the invention to compensating the accidental losses on a long-haul link L. A constant passband variable gain optical amplifier $A_{n+1}$ compensates an increase in the losses on the link L. The link L includes n fixed gain amplifiers $A_1, \ldots, A_n$, transmitting a plurality $\Sigma\lambda i$ of wavelength-division multiplexed optical signals. The amplifier $A_{n+1}$ has an input connected to the output S of the link L and an output connected via an optical coupler CP to a device U that uses the wanted optical signals.

The coupler CP samples a fraction of the optical signals supplied at the output of the amplifier $A_{n+1}$ and supplies to the input of a bandpass filter FPB the passband of which constitutes the noise measurement band BB which lies outside the wanted signal band BS. The output of the filter FPB is connected to an input of a device MP for measuring the mean power of the noise signal supplied by the filter. The device MP subtracts this mean power from a reference value Ref corresponding to the nominal losses of the link L and supplies a mean signal and the nominal value Ref. The control signal supplied at the output of the device MP is applied to a gain control input of the amplifier $A_{n+1}$ to adjust its gain to reduce the difference between the mean noise power and the nominal value Ref.

Figure 3:
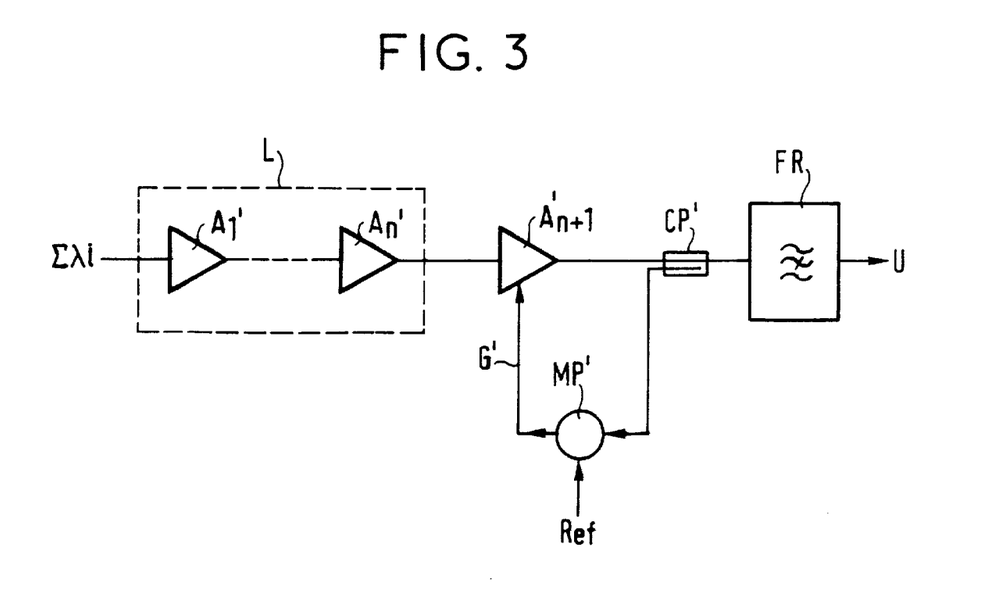
FIG. 3 represents the block schematic of a second example of an application of the amplifier of the invention.

FIG. 3 represents the block schematic of a second example of an application of the amplifier of the invention. Analogous components are identified by the same reference symbols as in FIG. 2 but primed. In this example the filter used is a band rejection filter FR, to be more precise a filter that reflects towards its input the signals that it rejects. Here the band rejected is the noise measurement band BB. A coupler CP' and the filter FR are inserted in this order between the output of the amplifier $A'_{n+1}$ and a user device U. One port of the coupler CP' extracts a fraction of the signal reflected by the filter FR and applies it to an input of a device MP' that measures the mean power of the noise signal, subtracts it from a nominal value Ref' and supplies a gain control signal for the amplifier $A'_{n+1}$.

In one preferred embodiment the filter FR includes a Bragg grating etched on an optical fiber.

Figure 4:
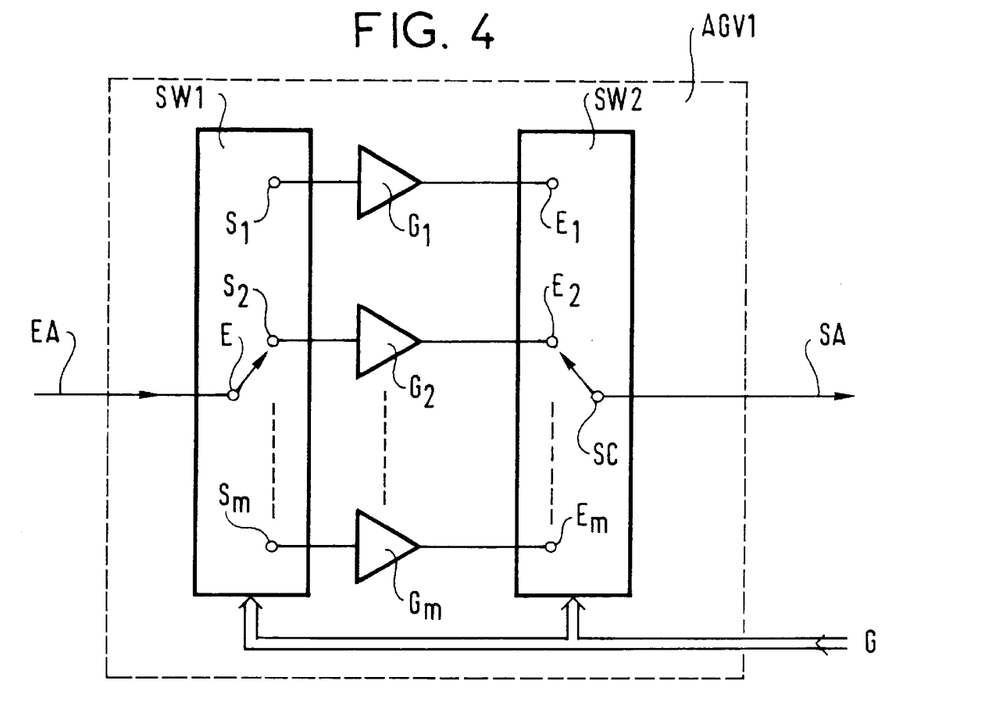
FIG. 4 represents the block schematic of a first variant of the amplifier of the invention.

FIG. 4 represents the block schematic of a first variant of the amplifier of the invention. This variant AGV1 includes:

an input EA receiving an optical multiplex incorporating a plurality of carriers;

a control input receiving a binary word G representing the required gain;

an output SA reconstituting the amplified optical multiplex;

a first optical switch SW1 having an input E connected to the input EA of the variable gain amplifier AGV1, m outputs $S_1, S_2, \ldots, S_m$ and a control input receiving the binary word G;

a second optical switch SW2 having an output SC connected to the output SA of the variable gain amplifier AGV1, m inputs $E_1, E_2, \ldots, E_m$ and a control input receiving the binary word G;

m amplifiers $G_1, G_2, \ldots, G_m$, each having a fixed gain different from the gains of the other amplifiers and having a gain excursion as a function of wavelength at most equal to a given common value in the transmission band of the optical signals, each amplifier $G_1, G_2, \ldots, G_m$ having an input connected to an output of the first switch SW1 and having an output connected to an input of the second switch SW2.

The amplifiers $G_1, G_2, \ldots, G_m$ therefore connect the outputs $S_1, S_2, \ldots, S_m$ respectively to the inputs $E_1, E_2, \ldots, E_m$. The structure of the switch SW1 is such that the outputs $S_1, S_2, \ldots, S_m$ are connected to the input E when the binary word G takes the respective values $1, 2, 3, \ldots, m$. Likewise, the structure of the switch SW2 is such that the inputs $E_1, E_2, \ldots, E_m$ are connected to output SC when the binary word G takes the respective values $1, 2, \ldots, m$. Accordingly, if the value of the binary word G is equal to an integer i between 1 and m, the optical multiplex is amplified by the amplifier $G_i$ with the fixed gain corresponding to that amplifier and with the same passband regardless of the amplifier selected.

The amplifiers $G_1, \ldots, G_m$ can be doped fiber amplifiers or semiconductor amplifiers.

Figure 5:
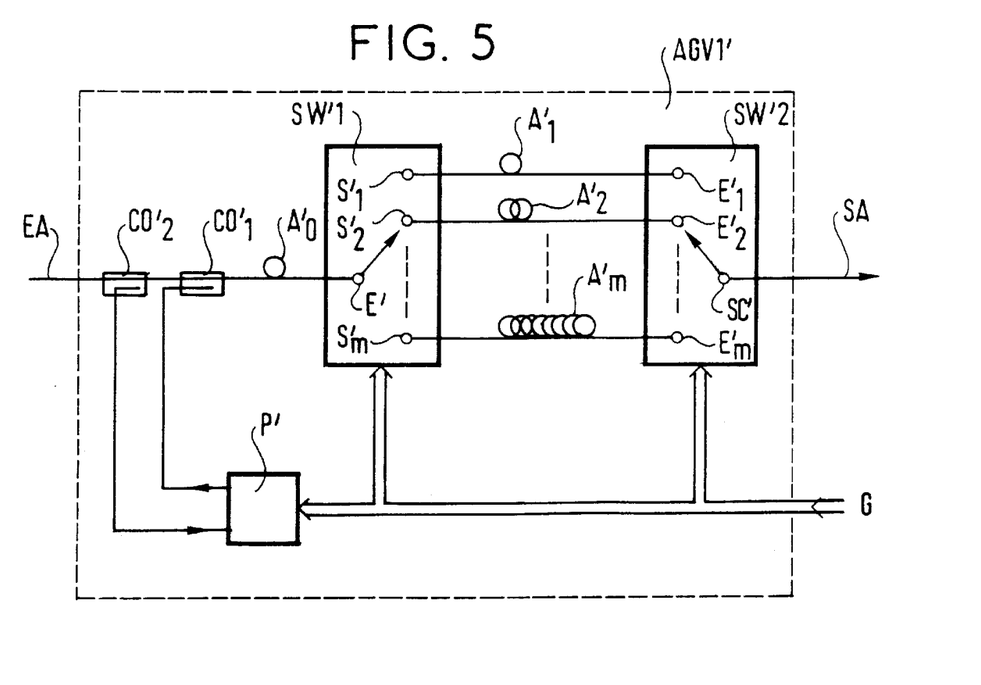
FIG. 5 represents the block schematic of a first embodiment of the first variant of the amplifier of the invention.

FIG. 5 represents the block schematic of a first embodiment AGV1' of the first variant of the amplifier of the invention. This example includes:

a first switch SW'$_1$ and a second switch SW'$_2$ identical to the switches SW1 and SW2, respectively;

m sections of doped optical fiber $A'_1, A'_2, \ldots, A'_m$ respectively connecting the outputs of the switch SW'$_1$ to the inputs of the switch SW'$_2$;

an optical fiber section $A'_0$ having one end connected to the input E' of the switch SW'$_1$;

an optical coupler CO'$_1$ having a port connected to the other end of the doped optical fiber section $A'_0$, a second port and a third port;

an optical pump device P' having an output supplying pump energy to the second port of the coupler CO'$_1$, a first control input receiving the gain control binary word G and a second control input; and an optical coupler CO'$_2$ having a port connected to the third port of the coupler CO'$_1$, a port connected to the second control input of the generator P' to supply to it a fraction of the amplified spontaneous emission of the variable gain amplifier AGV1' and a port constituting the input EA of the variable gain amplifier AGV1'.

The fiber section $A'_0$ constitutes a pre-amplifier upstream of the battery of amplifiers consisting of the fiber sections $A'_1, A'_2, \ldots, A'_m$. It provides a gain equal to approximately half the maximal gain of the amplifier AGV1'. The gain of the pre-amplifier $A'_0$ prevents the insertion losses of the switch SW'$_1$ influencing the noise factor of the amplifier AGV1'.

The coupler CO'$_1$ applies the pump energy codirectionally to the fiber section $A'_0$ and to whichever fiber section $A'_1, A'_2, \ldots, A'_m$ m is in service at the time in question.

The coupler CO'$_2$ controls the gain of the amplifier AGV1' using the method described in French patent application No. 2 714 982 so that it has exactly the value represented by the binary word G.

Figure 6:
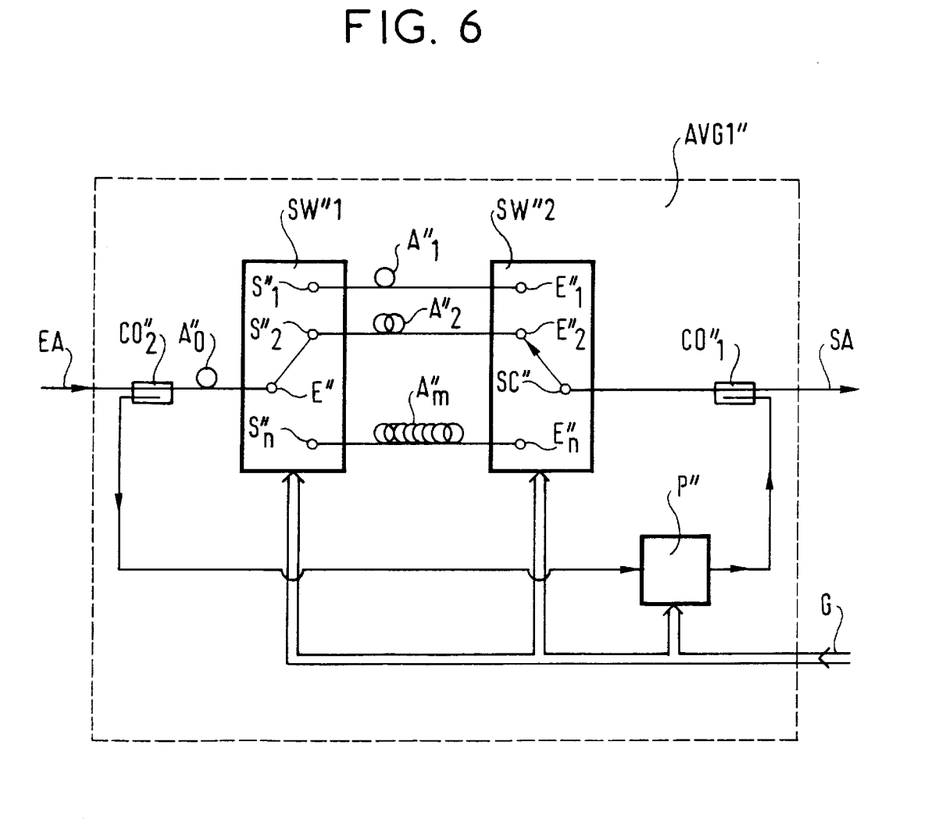
FIG. 6 represents the block schematic of a second embodiment of the first variant of the amplifier of the invention.

FIG. 6 represents the block schematic of a second embodiment AGV1" of the first variant of the amplifier of the invention. This embodiment includes:

a first switch SW"$_1$ and a second switch SW"$_2$ identical to the switches SW'$_1$ and SW'$_2$, respectively;

m doped optical fiber sections $A"_1, A"_2, \ldots, A"_m$ respectively connecting the outputs of the switch SW"$_1$ to the inputs of the switch SW"$_2$;

an optical fiber section $A"_0$ having a first end connected to the input E" of the switch SW"$_1$;

a first optical coupler CO"$_1$ having a port connected to the output SC" of the second switch SW"$_2$, a second port constituting the output SA"of the variable gain amplifier SVG1" and a third port;

an optical pump device P" having an output supplying pump energy to the third port of the coupler CO"$_1$, a first control input receiving the gain control binary word G and a second control input; and a second optical coupler CO"$_2$ having a port connected to the second end of the fiber section $A"_0$, a port connected to the second control input of the generator P' to supply to it a fraction of the amplified spontaneous emission of the variable gain amplifier AGV1" and a port constituting the input EA of the variable gain amplifier AGV1".

The fiber section $A"_0$ constitutes a pre-amplifier upstream of the battery of amplifiers consisting of the fiber sections $A"_1, A"_2, \ldots, A"_m$. It provides a gain equal to approximately half the maximal gain of the amplifier AGV1". The gain of the pre-amplifier $A"_0$ prevents the insertion losses of the switch SW"$_1$ influencing the noise factor of the amplifier AGV1".

The coupler CO"$_1$ applies the pump energy contradirectionally to the fiber section $A"_0$ and to whichever fiber section $A"_1, A"_2, \ldots, A"_m$ is in service at the time in question.

The coupler CO"$_2$ controls the gain of the amplifier AGV1' using the method described in French patent application No. 2 714 982 so that it has exactly the value represented by the binary word G.

Figure 7:
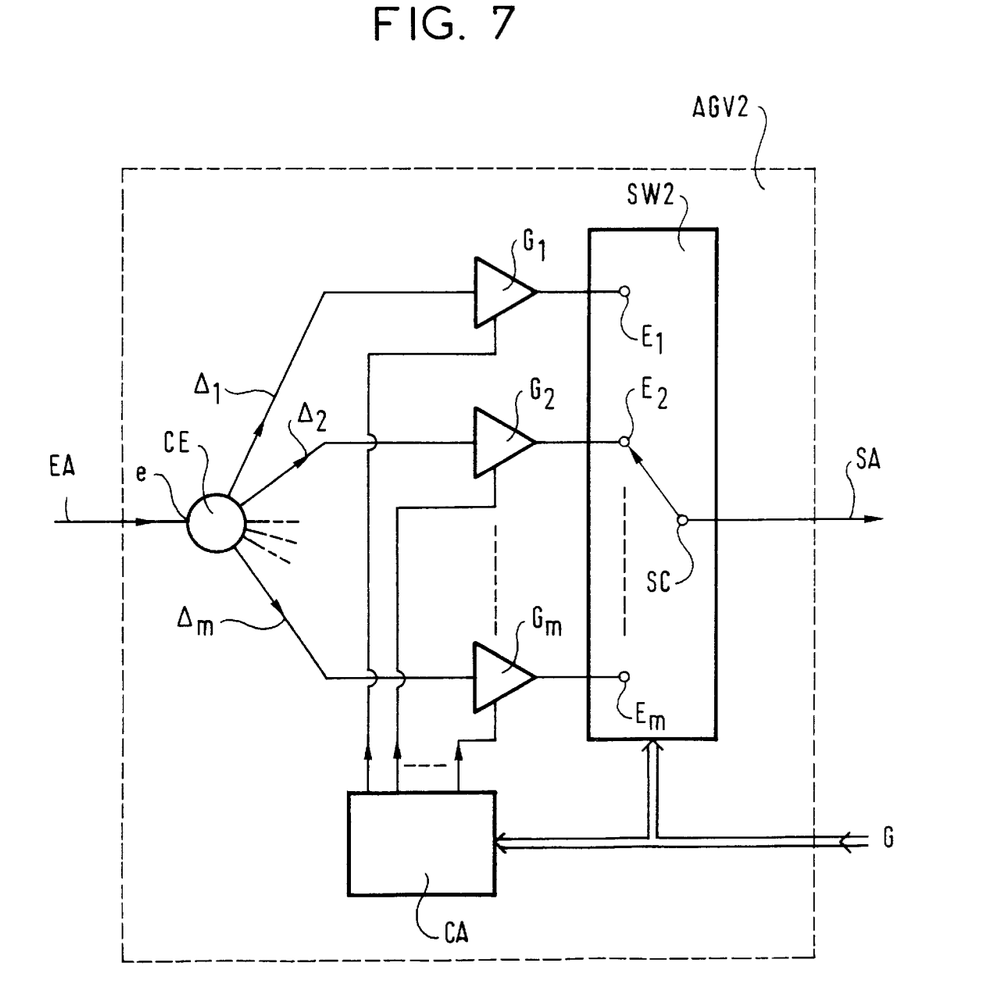
FIG. 7 represents the block schematic of a second variant of the amplifier of the invention.

FIG. 7 represents the block schematic of a second variant AGV2 of the amplifier of the invention. This variant differs from the first one in that the switch SW1 is replaced by:

a star coupler CE having a port e constituting the input EA of the amplifier AGV2 and m ports $s_1, \ldots, s_m$ respectively connected to the inputs of the m amplifiers $G_1, \ldots, G_m$; and a device CA controlling the energy supply to amplifiers $G_1, \ldots, G_m$, in accordance with the gain control word G so that the amplifier $G_i$ is the only one operating if the word G has the value i.

The amplifiers $G_1, \ldots, G_m$ can be doped fiber amplifiers or semiconductor amplifiers. In the case of semiconductor amplifiers, they are respectively activated or deactivated by connecting or disconnecting their electrical power supply.

Figure 8:
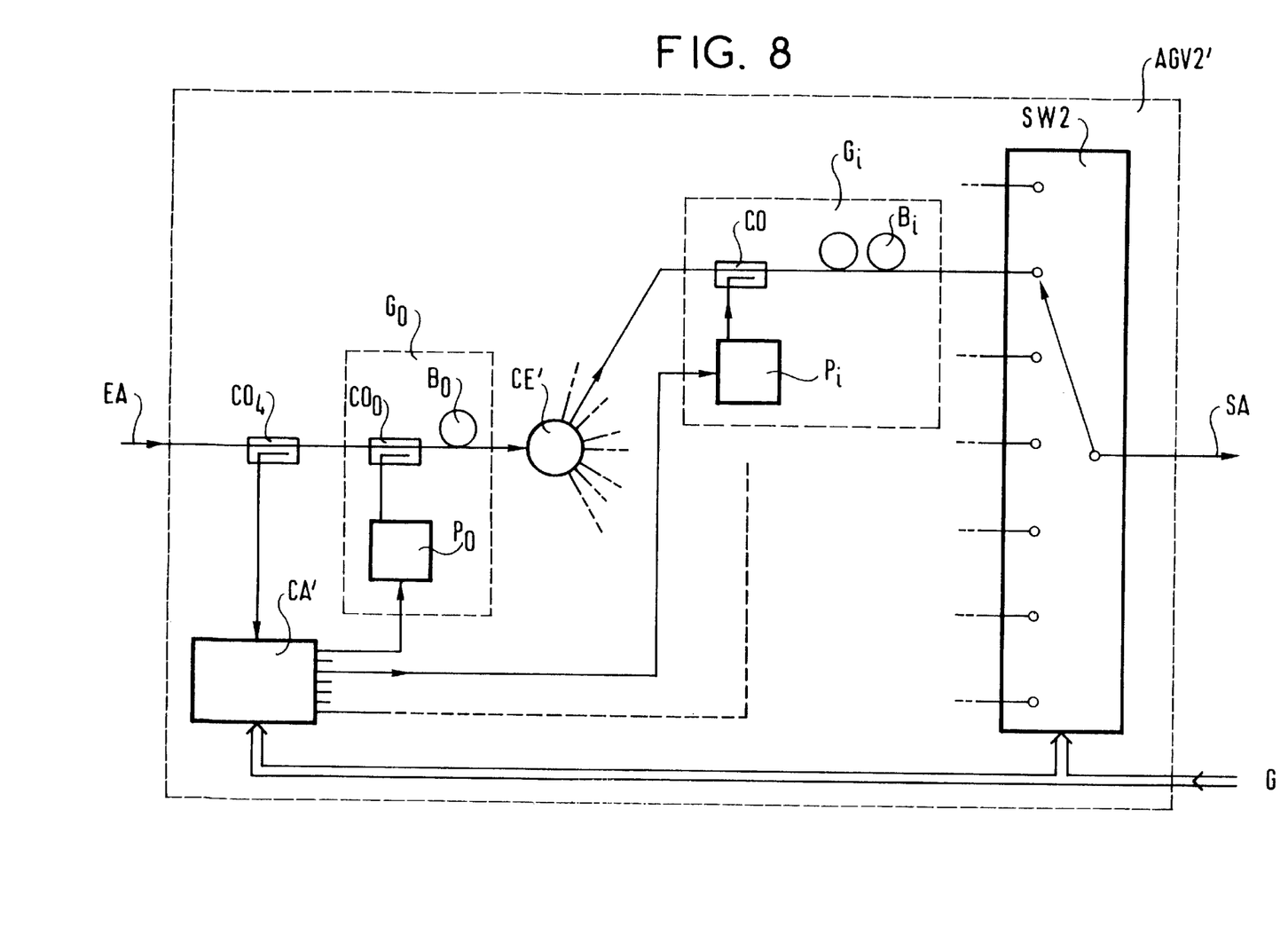
FIG. 8 represents the block schematic of one embodiment of the second variant of the amplifier.

FIG. 8 represents the block schematic of one embodiment AGV2' of the second variant of the amplifier of the invention. It includes:

m doped fiber amplifiers $G_1, \ldots, G_m$, each having a fixed gain different from the gain of the others and of which only the amplifier $G_i$ is shown by way of example;

a switch SW$_2$ identical to that described previously;

a star coupler CE' having m+1 ports of which m are respectively connected to inputs of the m amplifiers $G_1, \ldots, G_m$;

a pre-amplifier $G_0$ having an output connected to a port of the star coupler CE;

a coupler $CO_4$ having a port constituting the input EA of the amplifier AGV2' and a port connected to an input of the pre-amplifier $G_0$; and a power supply control circuit CA' having a control input receiving the binary gain control word G, an input connected to a port of the coupler $CO_4$ that supplies it with a fraction of the amplified spontaneous emission of the amplifier AGV2' and m+1 outputs respectively connected to control inputs of the pre-amplifier $G_0$ and of the amplifiers $G_1, \ldots, G_m$.

For example the amplifier $G_i$ includes:

a doped fiber section $B_i$, the length of which is different for each of the amplifiers $G_1, \ldots, G_m$, and a first end of which constitutes the output of the amplifier $G_i$;

a coupler $CO_i$ for injecting a pump wave into the fiber section $B_i$ and having a port constituting the input of the amplifier $G_i$ and a port connected to the second end of the fiber section $B_i$; and an optical pump $P_i$ having an output connected to a port of the coupler $CO_i$ and a control input constituting the control input of the amplifier $G_i$.

The pre-amplifier $G_0$ has a similar structure: a fiber section $B_0$, an optical pump $P_0$ and a coupler $C_0$.

The circuit CA' activates a chosen one of the amplifiers $G_1, \ldots, G_m$ according to the value of the binary word G, which is between 1 and m. It selects the amplifier $G_i$ if this value is i. It activates the pre-amplifier $G_0$ continuously. It controls the gain of the system $G_0$–$G_i$ by comparing the power of the amplified spontaneous emission with a set point value that can be different for the different values of the gain control word G.

The scope of the invention is not limited to the embodiments described hereinabove. The amplifier fibers can be pumped codirectionally or contradirectionally or both at the same time.

I claim:

1. A variable gain optical amplifier having a given passband, its gain being adjusted by a gain control signal that can take m discrete values, characterized in that it includes:

m optical amplifiers each having a fixed gain different from the gains of the other amplifiers and a gain excursion as a function of wavelength at most equal to a common value in the given band;

a first switch having an input coupled to the input of the variable gain amplifier, m outputs respectively coupled to the inputs of the m fixed gain amplifiers and a control signal input receiving the gain control signal; and a second optical switch having m inputs respectively coupled to the outputs of the m fixed gain amplifiers, an output coupled to the output of the variable gain amplifier and a control input receiving the gain control signal.

2. An amplifier according to claim 1 characterized in that the first switch includes an optical switch connecting its input to one only of its outputs, this output being determined by the gain control signal.

3. Amplifier according to claim 1 characterized in that the first switch includes:

a star coupler coupling the input of the variable gain amplifier to inputs of all the fixed gain amplifiers simultaneously; and a power supply supplying power to only one of the fixed gain amplifiers, this amplifier being selected in accordance with the gain control signal.

4. An amplifier according to claim 2 characterized in that each fixed gain amplifier includes:

a doped fiber having a distinct length and connecting an input of the second switch to an output of the first switch;

a pump wave generator common to all the fixed gain amplifiers having a first control input receiving the gain control signal and an output supplying a pump wave having a constant wavelength but a different power according to the gain control signal; and a first coupler having a port connected to an output of the generator, a port coupled to the input of the variable gain amplifier and a port coupled to the input of the first switch.

5. An amplifier according to claim 4 characterized in that it further includes a second coupler having a port connected to a second control input of the generator to supply to it a fraction of the amplified spontaneous emission of the variable gain amplifier, a port coupled to the input of the variable gain amplifier and a port coupled to the input of the first switch and in that the pump wave generator supplies a pump power that is dependent on the power of the amplified spontaneous emission that it receives on its second control input.

6. An amplifier according to claim 2 characterized in that each fixed gain amplifier includes:

a doped fiber having a distinct length and connecting an input of the second switch to an output of the first switch;

a pump wave generator common to all the fixed gain amplifiers and having a first control input receiving the gain control signal and an output supplying a pump wave having a constant wavelength but a different power according to the gain control signal; and a first coupler having a port connected to an output of the generator, a port coupled to the output of the variable gain amplifier and a port coupled to the output of the second switch.

7. An amplifier according to claim 6 characterized in that it further includes a second coupler having a port connected to a second control input of the generator to supply to it a fraction of the amplified spontaneous emission of the variable gain amplifier, a port coupled to the input of the variable gain amplifier, a port coupled to the input of the variable gain amplifier and port coupled to the input of the first switch and in that the pump wave generator supplies a pump power that is dependent on the power of the amplified spontaneous emission that it receives at its second control input.

8. An amplifier according to claim 1 characterized in that it further includes a common pre-amplifier stage between the input of the variable gain amplifier and the input of the first switch.

9. An amplifier according to claim 8 characterized in that the common pre-amplifier stage includes a doped fiber.

10. A system for automatically compensating variations in the losses on an optical link characterized in that it includes a variable gain amplifier according to claim 1 controlled by a relative loss measurement circuit measuring losses on the link, the loss measurement circuit supplying a signal used as the gain control signal.

* * * * *